March 18, 1958 N. BALDWIN 2,827,541
ELECTRIC STEAM PRODUCING DEVICES
Filed April 4, 1955 2 Sheets-Sheet 1

INVENTOR
Nathaniel Baldwin

United States Patent Office 2,827,541
Patented Mar. 18, 1958

2,827,541

ELECTRIC STEAM PRODUCING DEVICES

Nathaniel Baldwin, Salt Lake City, Utah

Application April 4, 1955, Serial No. 498,894

11 Claims. (Cl. 219—40)

The present invention apertains to steam producing devices in which the heat is produced by an electric current and in which the highest of efficiency is required.

The objects of the present invention are to obtain in a device as above indicated, simplicity, economy, perfect automatic control, convenience, and safety. I attain these and other objects by the mechanism illustrated in the accompanying drawings, Sheet 1 and Sheet 2, in which Fig. 1 shows several parts of the mechanism in axial section; which parts are connected by pipes or hoses; and Fig. 2 is a section showing a construction in which the several essential elements are built into a unit.

Figure 1:
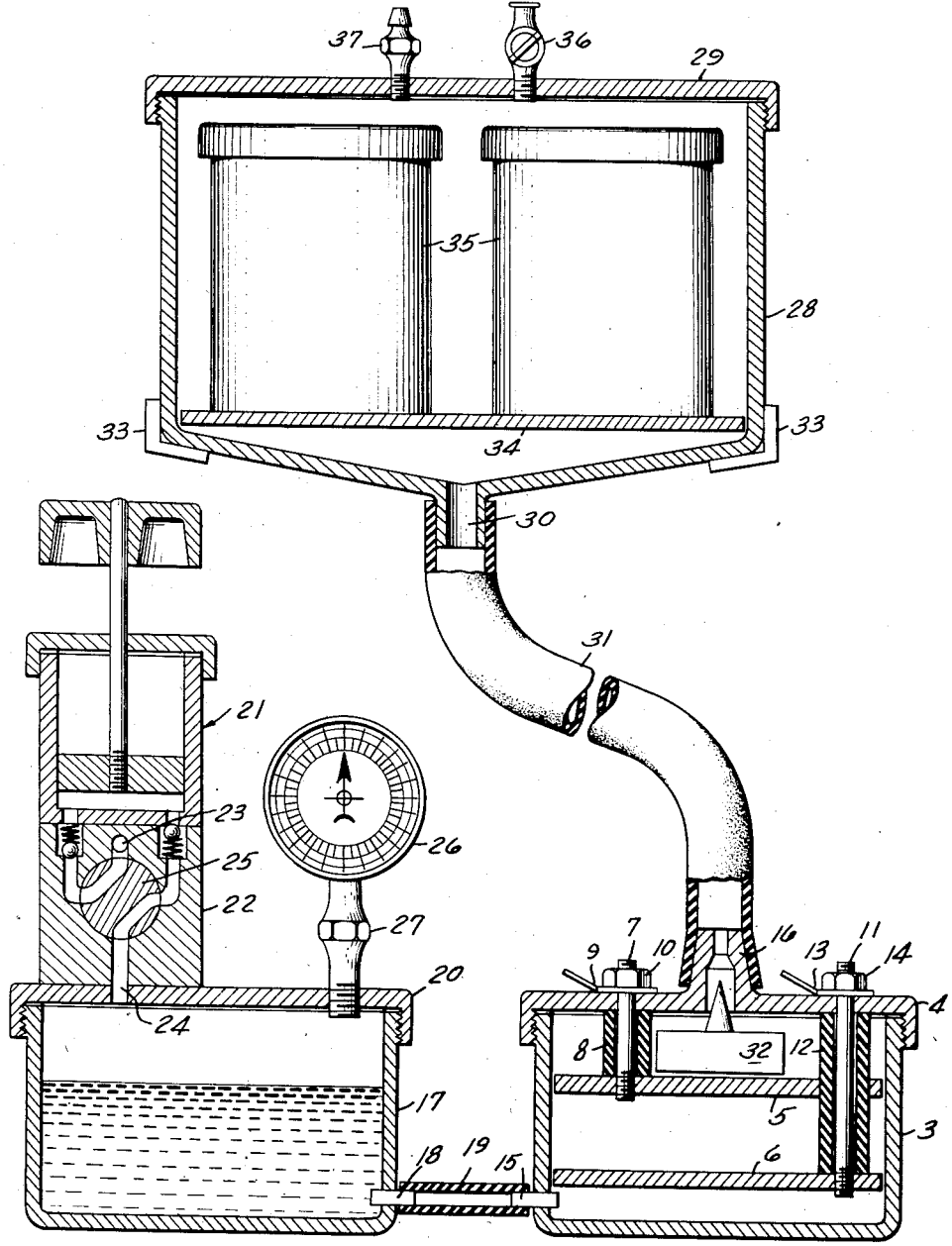
Figure 2:
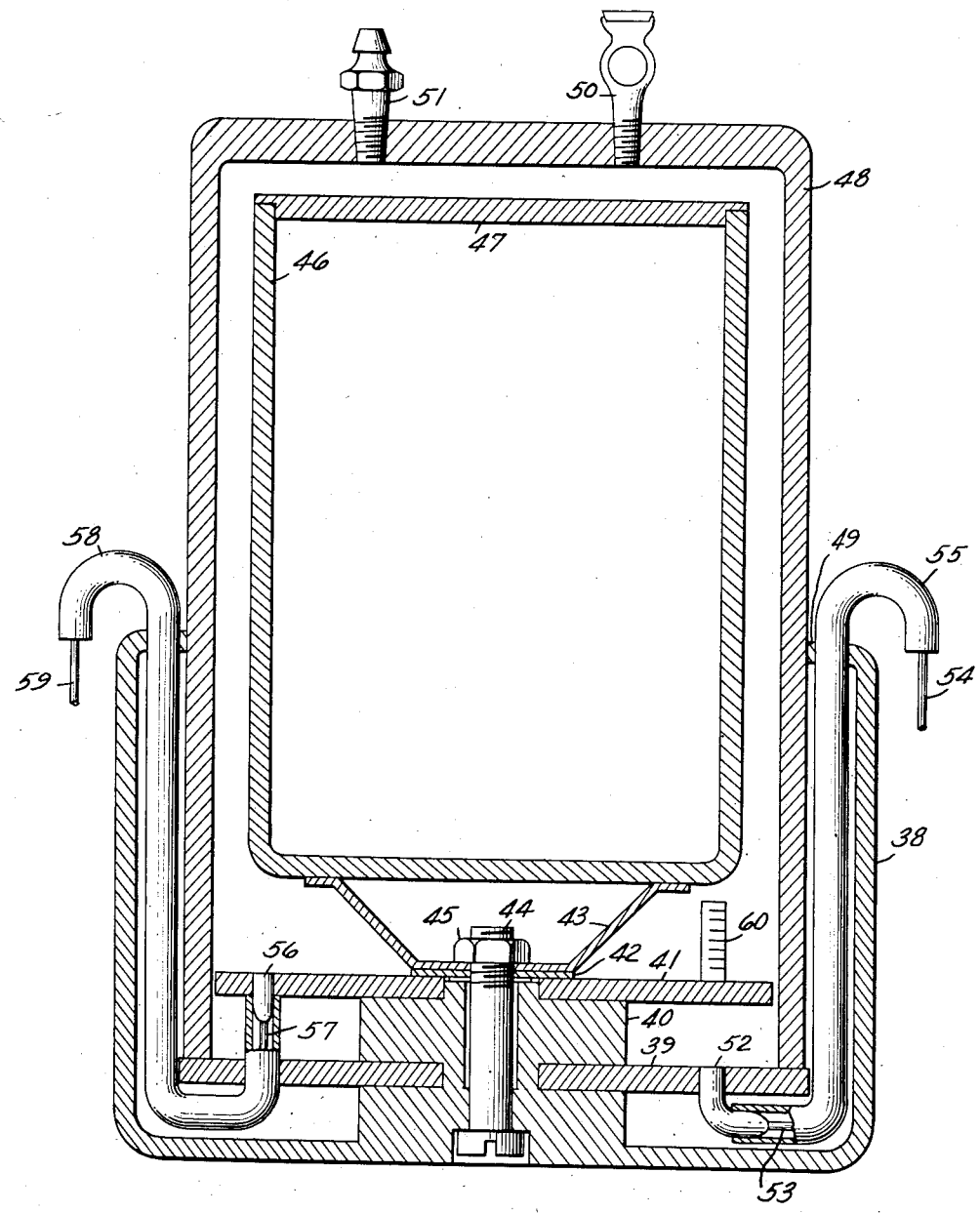

As shown in Fig. 1 the main parts of the steam producing mechanism consist of a cylindrical vessel 3 containing water, with cover 4 and two electrodes 5 and 6. Electrode 5 is anchored to the cover 4 by means of the rod 7, insulating tube 8, terminal 9, and nut 10. Electrode 6 is anchored to the cover 4 by means of the rod 11, insulating tube 12, terminal 13, and nut 14, the insulating tube 12 passing through an aperture in the electrode 5. The containing vessel 3 and cover 4 preferably may be made of insulating material such as earthenware, porcelain, or glass, but it is obvious that they may be made of metal if appropriate insulation is used. Nipples 15 and 16 serve to connect the vessel 3 to other parts of the mechanism.

A reservoir 17 for water and air under adjustable pressure is connected to the vessel 3 by means of the nipple 18 and tube 19 which may be a hose or a pipe.

The lid 20 of the reservoir connects with an air pump 21 through a valve mechanism 22. In this valve mechanism the aperture 23 connects with the open air and the aperture 24 connects with the reservoir through the lid 20. With the double perforated valve 25 in position as shown in the figure, the pump 21 serves as a compression pump, but if turned quarter way around, it will serve as an exhaustion pump; so the pressure in the reservoir is adjustable, above or below the atmospheric pressure. A pressure gauge 26 connected to the reservoir lid through the pipe 27 shows the pressure in the reservoir.

Steam from the generating vessel 3 may be used for any desired purpose, but in the figure, the use of a cooking vessel 28 with lid 29 is shown, being connected through the nipple 30 and pipe or hose 31. The float valve 32 will prevent water from the vessel 3 from rising into the vessel 28. 33, 33 are supporting brackets. The bottom of the vessel 28 slopes downward to the nipple 30 so that water resulting from the condensation of steam in the vessel 28 will find its way back to the generating vessel 3. Within the cooking vessel 28 is a platform or screen 34 on which are placed containers 35 in which food is to be cooked. These containers may be open dishes or they may be vessels with covers, preferably standard fruit jars, adapted to be sealed to retain flavors and vitamins, and also adapted to be transferred to a refrigerator when the cooking is completed.

Mounted upon the lid 29 is a valve 36 which can be opened when desired to let the air out of the vessel 28, and when it is closed there will be a little leakage of steam through a small hole in the top of the nipple 37, the purpose of which is to avoid the accumulation of air or other gases in the system which might dilute the steam and disturb the regulation of the temperature.

Having the terminals 9 and 13 connected to a suitable power circuit, it will be seen that when there is enough water in the vessel 3 to contact the electrode 5, the water will be heated between the electrodes and steam will be generated. As soon as the steam pressure is sufficient it will push some of the water out of the vessel 3 into the reservoir 17, compressing the air. Then the current will be broken until some of the steam condenses, when some of the water will return and make contact again. In this way a continual racing of the water between the vessel 3 and the resorvoir 17 is likely to occur, but if the upper electrode is set on a slant, or if the electrodes are disposed in a vertical position, a condition of equilibrium is likely to be reached in which the generation of steam will balance the condensation.

In case it is desired to do cooking at a pressure lower than that of the atmosphere, it is only necessary to shut the valve 36, stop the small hole in the nipple 37, change the valve 25, and then exhaust the system to the desired pressure.

Fig. 2 is a section of a cooker unit which embraces all the features of the several parts shown in Fig. 1, except that there is no provision for varying the pressure. The containing vessel 38 has a thickened or raised portion surrounding the center at the bottom on which is laid the electrode 39, then the insulating spacer 40, then the electrode 41, an insulating washer 42, then the bracket 43, and finally, all these parts are anchored to the bottom of the containing vessel by the bolt 44 and nut 45.

The containing vessel 38 preferably may be made of insulating material such as earthenware, porcelain, or glass, in which case the electrodes are thoroughly insulated. The vessel 46 containing the food to be cooked, with cover 47 is placed upon the supporting bracket 43. Then the cylindrical cover 48 is placed over the food container 46 and within the containing vessel 38 and seated upon the electrode 39. An inwardly projecting flange 49 at the top of the containing vessel 38 holds the cover 48 in proper position. A valve 50 and nipple 51 mounted on top of the cover 48 are similar to the valve 36 and nipple 37 in Fig. 1 and are for the same purpose.

Set into the bottom of the electrode 39 is a bent stud 52 which has a perforation in the end which receives a conducting wire 53. The other end of this conducting wire forms one of the terminals 54 for connection with the electric circuit. An insulating tube 55 surrounding the wire 53 has one end fitted onto the stud 52. This tube with the inclosed conductor wire is bent upward over the edge of the electrode 39 and passes out through a perforation in the flange 49. Similarly a stud 56 set into the electrode 41 connects with a conducting wire 57 and insulating tube 58. This tube and inclosed conducting wire passes downward through a perforation in the electrode 39 and then bends upward over the edge of the said electrode 39 and passes out through another perforation in the flange 49. The outer end of this conducting wire forms the other terminal 59 for connection with the electric circuit. Upstanding from the top surface of the electrode 41 is an index 60 which is helpful in using this form of cooker, as will hereafter be shown. Likewise, a similar index 61 for the same purpose, is attached to the center of the lid 20, Fig. 1, and extends downward to a point on the level of the under side of the electrode 5.

It will be seen that when there is enough water in the containing vessel 38 to contact the electrode 41 the water will be heated between the electrodes and steam will be generated. As soon as the steam pressure is sufficient it will push some of the water out of the cover 48 and up into the space between it and the containing vessel 38. Then the current will be broken until some of the steam condenses and some of the water returns and makes contact again, the action being similar to that described in connection with Fig. 1.

When in operation the water will be boiling away slowly, the steam escaping through the small aperture in the nipple 51. When enough of the water has boiled away, the contact with the upper electrode will be broken conclusively and the cooking will stop. The more water that is put into the containing vessel 38 to start with, the longer the cooking will continue before it will automatically stop. Thus, by the use of the index 60 which shows the amount of excess water in the containing vessel 38, the time of the cooking may be predetermined and the cooker requires no further attention.

The following advantages of the present invention may be noted: It is simple and easy to operate, it is inexpensive, it is thoroughly automatic and uses only the necessary amount of electric power, it cannot burn anything, either cooking vessels or foods, it cannot boil anything in the food containing vessels, and this is a great advantage in preserving vitamins, the timing of the cooking can be made automatic, and with certain modifications of the invention the cooking temperature can be varied.

I claim:

1. An electric steam producing device of the class described comprising a space, herein called the first space, containing a pair of electrodes with water between them and adapted to produce steam, a second space above and in communication with the said first space, in which the steam is confined and utilized, a third space in communication with said first space by a passageway at a lower level than one of said electrodes and adapted to serve as a reservoir to receive water from the said first space when expelled therefrom by steam pressure and to return the water to said first space when the steam pressure subsides, and an open vent to allow the slow escape of steam from the said second space to eliminate any detrimental gas that may get mixed with the steam.

2. An electric steam producing device of the class described comprising a space, herein called the first space, containing a pair of electrodes with water between them and adapted to produce steam, a second space above and in communication with the said first space, in which the steam is confined and utilized, a third space in communication with said first space by a passageway at a lower level than one of said electrodes and adapted to serve as a reservoir to receive water from the said first space when expelled therefrom by steam pressure and to return the water to said first space when the steam pressure subsides, and an adjustable open vent to allow the slow escape of steam from the said second space to eliminate any detrimental gas that may get mixed with the steam.

3. An electric steam producing device of the class described comprising a space, herein called the first space, containing a pair of electrodes with water between them and adapted to produce steam, a second space above and in communication with the said first space, in which the steam is confined and utilized, a third space in communication with said first space by a passageway at a lower level than one of said electrodes and adapted to serve as a reservoir to receive water from the said first space when expelled therefrom by steam pressure and to return the water to said first space when the steam pressure subsides, an open vent to allow the slow escape of steam from the said second space to eliminate any detrimental gas that may get mixed with the steam, and an index by which to tell how much water to use in the device to last a predetermined length of time.

4. An electric steam producing device of the class described comprising a space, herein called the first space, containing a pair of electrodes with water between them and adapted to produce steam, a second space above and in communication with said first space, in which the steam is confined and utilized, a third space in communication with said first space by a passageway at a lower level than one of said electrodes and adapted to serve as a reservoir to receive water from said first space when expelled therefrom by steam pressure and to return the water to said first space when the steam pressure subsides, an open vent to allow the slow escape of steam from the said second space to eliminate any detrimental gas that may get mixed with the steam, an index by which to tell how much water to use in the device to last a predetermined length of time, and means to adjust the pressure in said third space.

5. An electric steam producing device of the class described comprising a space herein called the first space, containing a pair of electrodes with water between them and adapted to produce steam, a second space above and in communication with the said first space, in which the steam is confined and utilized, a third space in communication with said first space by a passageway at a lower level than one of said electrodes and adapted to serve as a reservoir to receive water from the said first space when expelled therefrom by steam pressure and to return the water to said first space when the steam pressure subsides, a vent to allow the slow escape of steam from the said second space to eliminate any detrimental gas that may get mixed with the steam, an index to tell how much water to use in the device to last a predetermined length of time, and a reversible pump by which to obtain the desired pressure in the said third space above or below the atmospheric pressure.

6. An electric steam producing device of the class described comprising an outer containing vessel to hold water, a pair of electrodes within said containing vessel with water between them and adapted to produce steam, a food container supported above said electrodes, a cover to completely cover said food container and one of said electrodes and some space beneath the upper one of said electrodes, a space surrounding said cover and within said containing vessel and adapted to serve as a reservoir to receive water from within said cover and from said electrodes when expelled therefrom by steam pressure and to return the water to said electrodes when the steam pressure subsides, and an open vent in said cover to allow the slow escape of steam from said cover to eliminate any detrimental gas that may get mixed with the steam.

7. An electric steam producing device of the class described comprising an outer containing vessel to hold water, a pair of electrodes within said containing vessel with water between them and adapted to produce steam, a food container supported above said electrodes, a cover to completely cover said food container and one of said electrodes and some space beneath the upper one of said electrodes, a space surrounding said cover and within said containing vessel and adapted to serve as a reservoir to receive water from within said cover and from said electrodes when expelled therefrom by steam pressure and to return the water to said electrodes when the steam pressure subsides, an open vent in said cover to allow the slow escape of steam from said cover to eliminate any detrimental gas that may get mixed with the steam, and an index by which to tell how much water to use in the device to last a predetermined length of time.

8. An electric steam producing device of the class described comprising a space, herein called the first space, containing a pair of electrodes with water between them and adapted to produce steam, a second space above and in communication with said first space, in which the steam is confined and utilized, a third space in communication with said first space by a passageway at a lower level than one of said electrodes and adapted to serve as a reservoir to receive water from said first space when expelled therefrom by steam pressure and to return the water to said first space when the steam pressure subsides, a food container completely inclosed in said second space and adapted to be sealed to retain flavors and vitamins, and adapted to be removed from the cooking chamber and used as a storage container for the food.

9. An electric steam producing device of the class described comprising a space, herein called the first space, containing a pair of electrodes with water between them and adapted to produce steam, a second space above and in communication with said first space, in which the steam is confined and utilized, a third space in communication with said first space by a passageway at a lower level than one of said electrodes and adapted to serve as a reservoir to receive water from said first space when expelled therefrom by steam pressure and to return the water to said first space when the steam pressure subsides, a food container completely inclosed in said second space and adapted to be sealed to retain flavors and vitamins, and adapted to be removed from the cooking chamber and used as a storage container for the food, and an index by which to tell how much water to use in the device to last a predetermined length of time.

10. An electric steam producing device of the class described comprising a space, herein called the first space, containing a pair of electrodes with water between them and adapted to produce steam, a second space above and in communication with said first space, in which the steam is confined and utilized, a third space in communication with said first space by a passageway at a lower level than one of said electrodes and adapted to serve as a reservoir to receive water from said first space when expelled therefrom by steam pressure and to return the water to said first space when the steam pressure subsides, a food container completely inclosed in said second space and adapted to be sealed to retain flavors and vitamins, and adapted to be removed from the cooking chamber and used as a storage container for the food, an index by which to tell how much water to use in the device to last a predetermined length of time, and means to adjust the pressure in said third space.

11. An electric steam producing device of the class described comprising a space, herein called the first space, containing a pair of electrodes with water between them and adapted to produce steam, a second space above and in communication with said first space, in which the steam is confined and utilized, a third space in communication with said first space by a passageway at a lower level than one of said electrodes and adapted to serve as a reservoir to receive water from said first space when expelled therefrom by steam pressure and to return the water to said first space when the steam pressure subsides, a food container, preferably a standard fruit bottle, completely inclosed in said second space and adapted to be sealed to retain flavors and vitamins, and adapted to be removed from the said second space and used as a storage container for the food, and an open vent to said second space.

References Cited in the file of this patent

UNITED STATES PATENTS

| | | |
|---|---|---|
| 1,539,692 | Noll | May 26, 1925 |
| 1,683,070 | Hanks | Sept. 4, 1928 |
| 1,958,590 | Peirce | May 15, 1934 |
| 1,987,381 | Twombly | Jan. 8, 1935 |
| 2,180,445 | Vickery | Nov. 21, 1939 |
| 2,357,634 | Crites | Sept. 5, 1944 |
| 2,562,843 | Grondahl | July 31, 1951 |